(12) United States Patent
Hu et al.

(10) Patent No.: US 10,705,346 B2
(45) Date of Patent: Jul. 7, 2020

(54) LASER UNIFORMLY MACHINING APPARATUS AND METHOD

(71) Applicant: INDUSTRIAL TECHNOLOGY RESEARCH INSTITUTE, Hsinchu (TW)

(72) Inventors: Pin-Hao Hu, Hsinchu (TW); Mao-Chi Lin, Hsinchu (TW); Yu-Chung Lin, Hsinchu (TW); Min-Kai Lee, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 449 days.

(21) Appl. No.: 15/410,311

(22) Filed: Jan. 19, 2017

(65) Prior Publication Data

US 2018/0101015 A1   Apr. 12, 2018

(30) Foreign Application Priority Data

Oct. 11, 2016 (TW) .............................. 105132732 A (51) Int. Cl.
*G02B 27/09* (2006.01)
*B23K 26/073* (2006.01)
(Continued)

(52) U.S. Cl.
CPC .......... *G02B 27/09* (2013.01); *B23K 26/0648* (2013.01); *B23K 26/0734* (2013.01);
(Continued)

(58) Field of Classification Search
CPC .................................................... G02B 27/09
(Continued)

(56) References Cited

U.S. PATENT DOCUMENTS

| 525,495 A | 9/1894 | Gleason |
| 4,494,015 A * | 1/1985 | Frieling .............. G11C 11/4074 |
| | | 326/88 |

(Continued)

FOREIGN PATENT DOCUMENTS

| CN | 1351529 A | 5/2002 |
| CN | 101680837 A | 3/2010 |

(Continued)

OTHER PUBLICATIONS

Fang et al. (CN 103235489B) translated (Year: 2013).*

(Continued)

*Primary Examiner* — Tu B Hoang
*Assistant Examiner* — Vy T Nguyen
(74) *Attorney, Agent, or Firm* — Rabin & Berdo, P.C.

(57) ABSTRACT

A laser uniformly machining apparatus and method thereof are provided. The apparatus includes a laser unit, a shaping element, a collimating element, a scaling element and a focusing element. The laser unit provides a laser beam for machining. The shaping element shapes the laser beam into an annular beam. The collimating element modifies the direction of the annular beam in accordance with the direction of an optical axis to turn the annular beam into a collimated annular beam. The scaling element adjusts the collimated annular beam in accordance with a scaling ratio to produce a scaled annular beam. The focusing element focuses the scaled annular beam. The scaled annular beam is produced by the scaling element to form a focused beam having a uniformly distribution of light intensity in the direction of the optical axis.

20 Claims, 7 Drawing Sheets

(51) Int. Cl.
*B23K 26/351* (2014.01)
*B23K 26/06* (2014.01)
*G02B 27/30* (2006.01)
*B23K 101/36* (2006.01)

(52) U.S. Cl.
CPC ........ *B23K 26/351* (2015.10); *G02B 27/0927* (2013.01); *G02B 27/0966* (2013.01); *G02B 27/30* (2013.01); *B23K 2101/36* (2018.08)

(58) Field of Classification Search
USPC .................. 355/67; 359/20, 619, 621, 626; 362/268; 438/166, 308, 487
See application file for complete search history.

(56) References Cited

U.S. PATENT DOCUMENTS

| | | | | |
|---|---|---|---|---|
| 5,336,875 | A | * | 8/1994 | Ono .................. G02B 5/32 235/462.32 |
| 5,754,278 | A | * | 5/1998 | Kurtz .................. G03B 27/542 355/67 |
| 5,864,430 | A | | 1/1999 | Dickey et al. |
| 5,923,475 | A | * | 7/1999 | Kurtz .................. B41J 2/451 359/619 |
| 6,433,301 | B1 | * | 8/2002 | Dunsky .............. B23K 26/073 219/121.67 |
| 8,023,206 | B2 | | 9/2011 | Laskin |
| 9,035,217 | B2 | | 5/2015 | Petring et al. |
| 9,296,066 | B2 | | 3/2016 | Hosseini et al. |
| 2007/0206258 | A1 | * | 9/2007 | Malyak .............. G02B 26/105 345/204 |
| 2015/0014889 | A1 | * | 1/2015 | Goya .................. B23K 26/38 264/400 |
| 2015/0036106 | A1 | * | 2/2015 | Nagahara ............ G03B 21/208 353/31 |
| 2015/0166391 | A1 | | 6/2015 | Marjanovic et al. |
| 2016/0016257 | A1 | | 1/2016 | Hosseini |
| 2016/0159679 | A1 | | 6/2016 | West |

FOREIGN PATENT DOCUMENTS

| | | | |
|---|---|---|---|
| CN | 202142770 U | | 2/2012 |
| CN | 203607373 U | | 5/2014 |
| CN | 103235489 B | * | 1/2015 |
| CN | 102869474 B | | 3/2015 |
| CN | 105607267 A | | 5/2016 |
| CN | 105750729 A | | 7/2016 |
| CN | 205393783 U | | 7/2016 |
| JP | 2005116800 A | | 4/2005 |
| JP | 2007310368 A | | 11/2007 |
| TW | 290223 | | 11/1984 |
| TW | 200636230 | | 10/2006 |
| TW | I282855 B | | 6/2007 |
| TW | I448730 B | | 8/2014 |
| TW | 201615316 A | | 5/2016 |

OTHER PUBLICATIONS

Honkanen et al. "Tandem systems for efficient generation of uniform-axial-intensity Bessel fields", Elsevier Science B.V. (Year: 1998).*
Taiwan Patent Office, Office Action, Patent Application Serial No. TW105132732, dated Jun. 30, 2017, Taiwan.
China Patent Office, Office Action dated Jan. 28, 2019.
Čižmár et al., Tunable Bessel light modes: engineering the axial propagation, Optics Express, Aug. 31, 2009, vol. 17, No. 18, pp. 15558-15570.
Popov et al., Apodized annular-aperture diffractive axicons fabricated by continuous-path-control electron beam lithography, Optics Communications, May 19, 1998, pp. 359-367.
Chen et al., Lens axicon illuminated by polychromatic Gaussian beams for generating uniform focal segments, Optik Optics, Jun. 28, 2007, pp. 56-61.
Cox et al., Constant-axial-intensity nondiffracting beam, Optics Letters, Feb. 15, 1992, vol. 17, No. 4, pp. 232-234.
Honkanen et al., Tandem systems for efficient generation of uniform-axial-intensity Bessel fields, Optics Communications, May 19, 1998, pp. 368-375.
Honkanen et al., Tandem systems for efficient generation of uniform-axial-intensity Bessel fields; Optics Communications, vol. 154, Issues 5-6, Sep. 15, 1998, pp. 368-375.

* cited by examiner

LASER UNIFORMLY MACHINING APPARATUS AND METHOD

CROSS-REFERENCE TO RELATED APPLICATION

The present disclosure is based on, and claims priority from, Taiwan Application Number 105132732, filed Oct. 11, 2016, the disclosure of which is hereby incorporated by reference herein in its entirety.

BACKGROUND

1. Technical Field

The present disclosure relates to laser machining apparatuses and methods, and, more particularly, to a laser uniformly machining apparatus and a laser uniformly machining method.

2. Description of the Prior Art

With the rapid development of touch panel industries, the technology for cutting transparent substrates, such as reinforced glass and sapphire substrates, has become increasingly important. Take a reinforced glass as an example. The reinforced glass has been reinforced internally or at the surface, and a stress of about tens to millions Pascal is created. The traditional processing machines thus face a bottleneck and encounter various problems, including frequent wearing out of machining heads, large processing defects, and so on. Since a laser beam of a laser processing apparatus has a variety of characteristics, such as high energy density and concentration and non-contact processing, the laser beam is widely used for processes such as cutting and drilling a workpiece having a transparent material.

Figure 1:
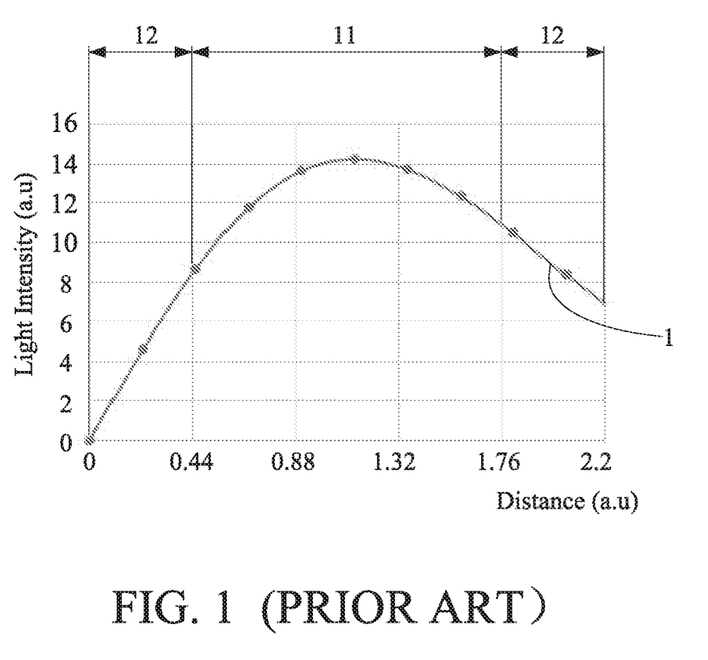
FIG. 1 is a graph depicting the distribution of light intensity of a focused beam produced by a laser machining.

FIG. 1 is a graph depicting the distribution of light intensity of a focused beam produced by a laser machining. The vertical and horizontal coordinates of FIG. 1 can be in any arbitrary unit (a. u.).

In the case that a rotating prism is used as a focusing element of a laser machining, the center cone angle of the rotating prism is about 90 degrees to 179 degrees, the distribution of light intensity of a focused beam 1 of the rotating prism in the direction of an optical axis can be seen as non-uniform, and the uniformity of the distribution of light intensity is generally less than 50%. When the distribution of light intensity of the focused beam 1 is not uniform and narrow, it is difficult to define the machining range 11 and the non-machining ranges 12 of the focused beam 1. As a result, during machining of a workpiece by the focused beam 1, the machined features of the workpiece may not be uniform, and the cutting speed of the laser machining can be very slow.

More specifically, the distribution of light intensity of the focused beam 1 in the direction of the optical axis is approximately Gaussian-like. That is, the energy at the center of the focused beam 1 (i.e. the machining range 11) is strongest, and the energy at the top and bottom ends of the focused beam 1 (i.e. the non-machining ranges 12) slowly attenuates. The non-uniform distribution of light intensity (energy) may have three disadvantages. First, the non-uniform light intensity leads to non-even cutting performance, such that after the workpiece is broken or stripped off, the fractured surface of the workpiece will have uneven machining features, such as an uneven roughness. Thus, a more complex post-processing is required to address the unevenness of the fractured surface. Second, the light intensity of the focused beam 1 in the direction of the optical axis attenuates too slowly, resulting in unclear boundaries between the machining range 11 and the non-machining ranges 12 of the focused beam 1, such that during a half-cut manufacturing process of a compound workpiece, for example, when cutting the upper half of the workpiece, it may also damage the circuits or glass at the lower half of the workpiece at the same time, the focused beam 1 therefore fails to satisfy the requirement of protecting the lower half of the workpiece during the half-cut manufacturing process. Third, similarly, due to the slow attenuation of the light intensity of the focused beam 1 in the direction of the optical axis, the light intensity of the focused beam 1 needs to be distributed to 1.5 to 2 times greater than the thickness of the workpiece, and the strongest energy at the center (i.e., the machining range 11) of the focused beam 1 is then directed to the workpiece for machining, but by doing so, it means some of the energy of the focused beam 1 is wasted on the non-machining ranges 12, thereby creating unnecessary waste of energy, and increasing the building cost of the laser machining.

SUMMARY

The present disclosure provides a laser uniformly machining apparatus and method for producing a focused beam with a uniformly distribution of light intensity.

The laser uniformly machining apparatus of the present disclosure may include: a laser unit for providing a laser beam for machining; a shaping element for shaping the laser beam into an annular beam; a collimating element for modifying the direction of the annular beam modified by the shaping element in accordance with the direction of an optical axis to turn the annular beam into a collimated annular beam; a scaling element for adjusting the collimated annular beam produced by the collimating element in accordance with a scaling ratio to produce a scaled annular beam; and a focusing element for focusing the scaled annular beam produced, wherein the scaled annular beam is produced by the scaling element to form a focused beam having a uniformly distribution of light intensity in the direction of the optical axis.

The laser uniformly machining method of the present disclosure may include: providing a laser beam for machining; shaping the laser beam into an annular beam; modifying the direction of the annular beam in accordance with the direction of an optical axis to turn the annular beam into a collimated annular beam; adjusting the collimated annular beam in accordance with a scaling ratio to produce a scaled annular beam; and focusing the scaled annular beam to form a focused beam having a uniform distribution of light intensity in the direction of the optical axis.

BRIEF DESCRIPTION OF THE DRAWINGS

FIG. 4B' is a graph depicting the distribution of the light intensity of an enlarged right portion of the annular beam in FIG. 4B in accordance with the present disclosure;

FIGS. 4E' and 4E" are graphs depicting distributions of light intensities of focused beams with different machining ranges produced by scaling elements with different scaling ratios in the laser uniformly machining apparatus of FIG. 2 in accordance with the present disclosure.

DETAILED DESCRIPTIONS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
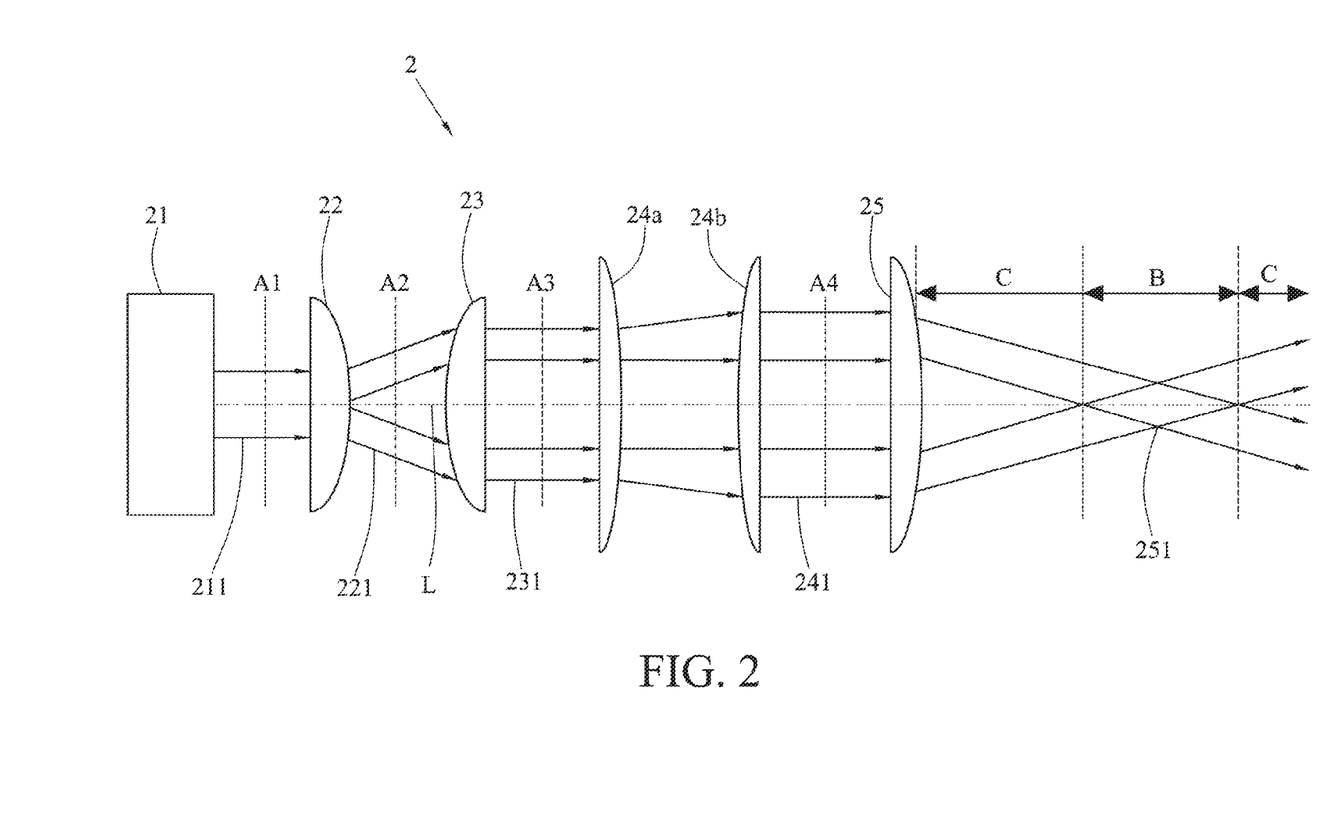
FIG. 2 is a block diagram depicting a laser uniformly machining apparatus in accordance with the present disclosure.
Figure 3:
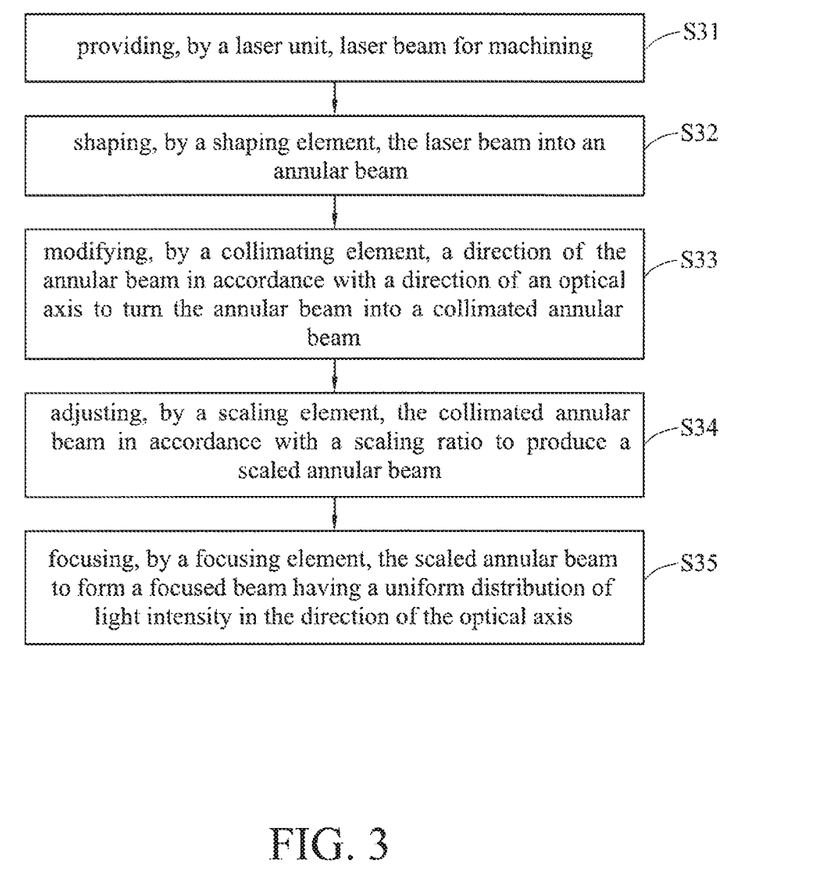
FIG. 3 is a flowchart illustrating the steps of a laser uniformly machining method in accordance with the present disclosure.
Figure 4A:
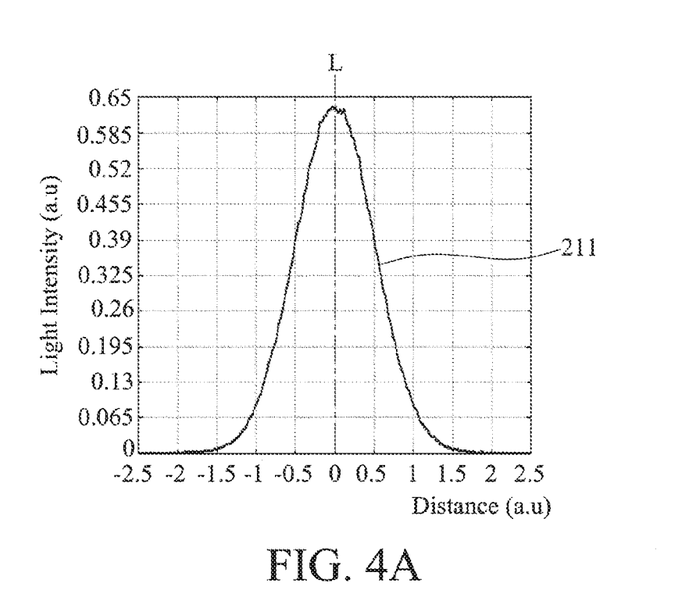
FIG. 4A is a graph depicting the distribution of the light intensity of a laser beam in segment A1 provided by a laser unit in the laser uniformly machining apparatus of FIG. 2 in accordance with the present disclosure.
Figure 4B:
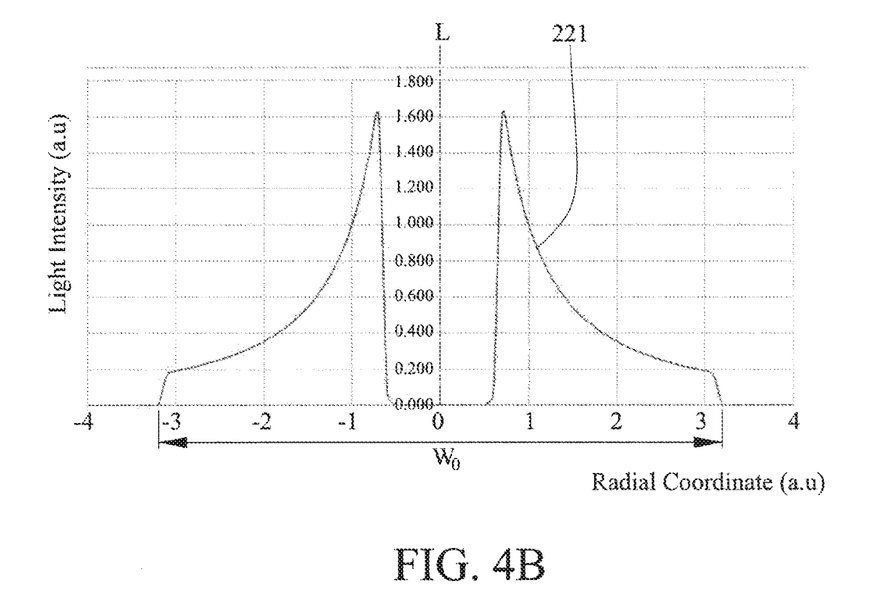
FIG. 4B is a graph depicting the distribution of the light intensity of an annular beam in segment A2 produced by a shaping element in the laser uniformly machining apparatus of FIG. 2 in accordance with the present disclosure.
Figure 4C:
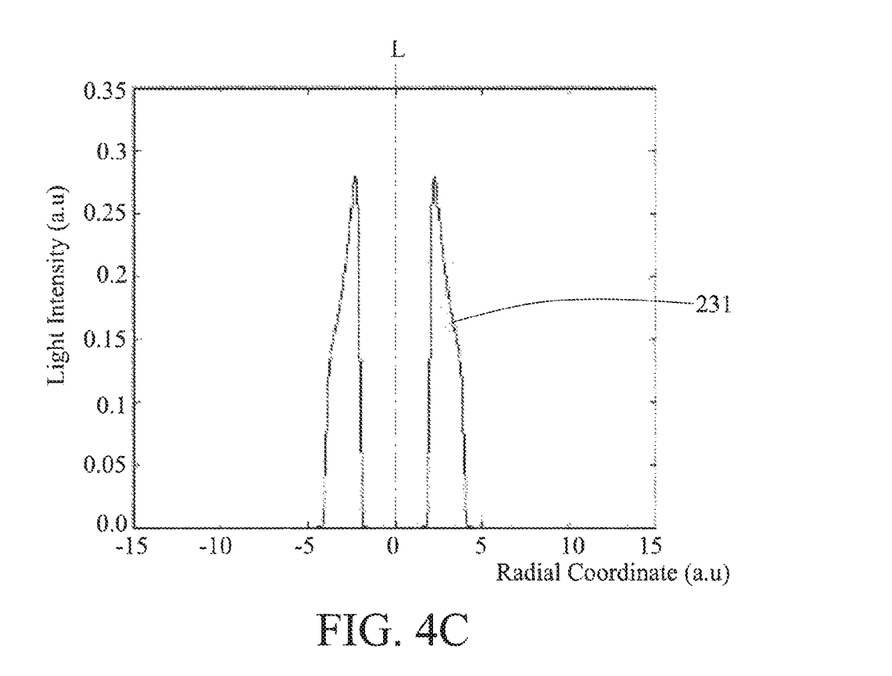
FIG. 4C is a graph depicting the distribution of the light intensity of a collimated annular beam in segment A3 produced by a collimating element in the laser uniformly machining apparatus of FIG. 2 in accordance with the present disclosure.
Figure 4D:
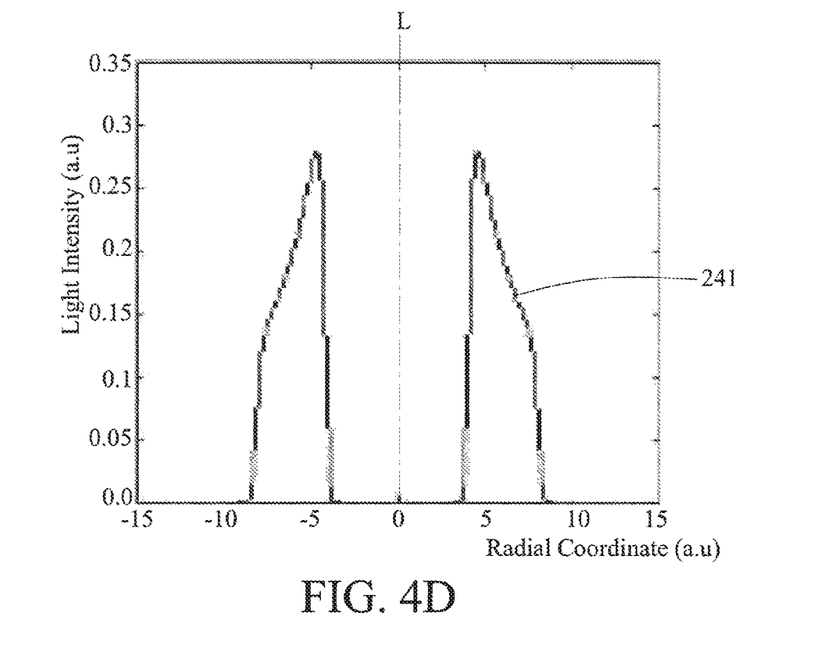
FIG. 4D is a graph depicting the distribution of the light intensity of a scaled annular beam in segment A4 produced by scaling elements in the laser uniformly machining apparatus of FIG. 2 in accordance with the present disclosure.
Figure 4E:
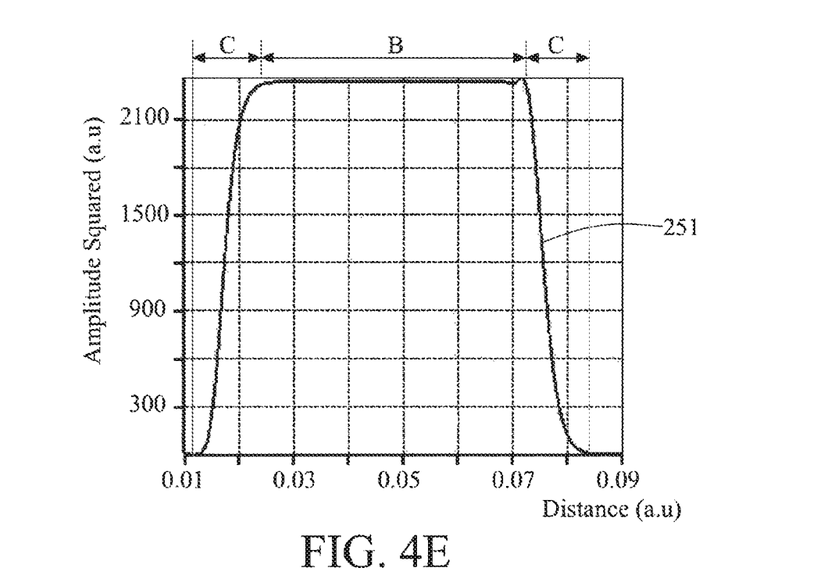
FIG. 4E is a graph depicting the distribution of the light intensity of a focused beam produced by a focusing element in the laser uniformly machining apparatus of FIG. 2 in accordance with the present disclosure.

FIG. 2 is a block diagram depicting a laser uniformly machining apparatus 2 in accordance with the present disclosure. FIG. 3 is a flowchart illustrating the steps of a laser uniformly machining method in accordance with the present disclosure. FIG. 4A is a graph depicting the distribution of light intensity of a laser beam 211 in segment A1 provided by a laser unit 21 in the laser uniformly machining apparatus 2 of FIG. 2 in accordance with the present disclosure. FIG. 4B is a graph depicting the distribution of light intensity of an annular beam 221 in segment A2 produced by a shaping element 22 in the laser uniformly machining apparatus 2 of FIG. 2 in accordance with the present disclosure. FIG. 4B' is a graph depicting the distribution of light intensity of an enlarged right portion of the annular beam 221 in FIG. 4B in accordance with the present disclosure. FIG. 4C is a graph depicting the distribution of light intensity of a collimated annular beam 231 in segment A3 produced by a collimating element 23 in the laser uniformly machining apparatus 2 of FIG. 2 in accordance with the present disclosure. FIG. 4D is a graph depicting the distribution of light intensity of a scaled annular beam 241 in segment A4 produced by scaling elements 24a and 24b in the laser uniformly machining apparatus 2 of FIG. 2 in accordance with the present disclosure. FIG. 4E is a graph depicting the distribution of light intensity of a focused beam 251 produced by a focusing element 25 in the laser uniformly machining apparatus 2 of FIG. 2 in accordance with the present disclosure.

In the present disclosure, units of the horizontal and vertical coordinates in FIGS. 4A to 4E" are arbitrary units. In other words, there is no limitation on the units used.

As shown in FIG. 2, the laser uniformly machining apparatus 2 includes, but is not limited to, a laser unit 21, a shaping element 22, a collimating element 23, scaling elements 24a and 24b, and a focusing element 25 sequentially arranged or associated. In other embodiments, the laser uniformly machining apparatus 2 may also include other elements (e.g., optical elements) in front of, behind or between any two neighboring ones of the laser unit 21, the shaping element 22, the collimating element 23, the scaling elements 24a and 24b, and the focusing element 25.

The laser unit 21 is used to provide a laser beam 211 shown in FIG. 4A for machining. The laser unit 21 can be a laser generator or the like. The laser beam 211 can be, but not limited to, a Gaussian beam.

The shaping element 22 shapes the laser beam 211 provided by the laser unit 21 into an annular beam 221 or a beam with an at least annular light distribution as shown in FIG. 4B (FIG. 4B'). In an embodiment, the shaping element 22 can be a phase modulation element, an amplitude modulation element, a diffraction element, an aspheric element, a spherical element, an absorption filter, a reflective filter or the like.

The collimating element 23 modifies the direction of the annular beam 221 in accordance with the direction of an optical axis L, so as to turn the annular beam 221 into a collimated annular beam 231 (i.e., the annular beam after collimation or modification) as shown in FIG. 4C. For example, the collimating element 23 may reduce the diffusion angle of the annular beam 221 of FIG. 4B (or FIG. 4B') to be within 10 degrees to produce the collimated annular beam 231 of FIG. 4C. In an embodiment, the collimating element 23 can be a phase modulation element, a diffraction element, an aspheric element, a spherical element or the like.

The scaling elements 24a and 24b adjust the collimated annular beam 231 in accordance with a scaling ratio to produce a scaled annular beam 241 as shown in FIG. 4D (i.e., the annular beam after scaling or adjustment). For example, the scaling elements 24a and 24b can scale-up or scale-down the collimated annular beam 231 of FIG. 4C in accordance with an adjustable scaling ratio or a fixed scaling ratio to produce the scaled annular beam 241 of FIG. 4D, such that the scaled annular beam 241 can turn into a focused beam 251 with an adjustable machining range B or machining depth of view (see FIG. 4E).

The focusing element 25 focuses the scaled annular beam 241 produced by the scaling elements 24a and 24b into a focused beam 251 as shown in FIG. 4E, and the focused beam 251 has a uniform light intensity in the direction of the optical axis L. In an embodiment, the focusing element 25 can be a rotating prism, a diffraction element, a spherical element, an aspheric element or the like. In another embodiment, the focused beam 251 can be a Bessel beam.

Further, as shown in FIG. 3 and FIGS. 4A to 4E", and in conjunction with FIG. 2, the steps of the laser uniformly machining method of the present disclosure are as follows.

In step S31, the laser unit 21 provides a laser beam 211 for machining as shown in FIG. 4A.

In step S32, the shaping element 22 shapes the laser beam 211 provided by the laser unit 21 into an annular beam 221 or a beam with an at least annular light distribution as shown in FIG. 4B (FIG. 4B').

The shaping element 22 may adjust the distribution of light intensity of the annular beam 221 in accordance with the relationship between the light intensity I and a radial coordinate R of the annular beam 221 as shown in Equation (1) below.

$$I(R)=I_o \cdot (R-r_o)^{-N} \cdot D(R,W,W_o) \quad (1)$$

wherein I is the light intensity of the annular beam 221; R is the radial coordinate of the annular beam 221; $I_o$ and $r_o$ are constants; N is an adjustable numerical value between 0.1 to 5, such as 0.1, 1, 2 or 5; W and $W_o$ are the annular width and the diameter of the annular beam 221, respectively; and $(R-r_o)^{-N}$ determines the attenuation rate of the light intensity I of the annular beam 221 with respect to the constant $r_o$. Therefore, $(R-r_o)^{-N}$ can be regarded as an envelope function of the annular beam 221, that is, an attenuation function of the light intensity envelope from the inner edge to the outer edge of the annular beam 221.

Moreover, D (R, W, $W_o$) is an annular width function of the annular beam 221, and is used mainly to determine parameters, such as the annular width W and the diameter $W_o$, of the annular beam 221. Taking an annular beam 221 with an annular width W and a diameter $W_o$ as an example, the values of the annular width function D (R, W, $W_o$) are as follows:

$$\begin{cases} D(R, W, W_o) \approx 1, \text{ when } W_o - W/2 \leq R \leq W_o + W/2 \\ D(R, W, W_o) \approx 0, \text{ when } R < W_o - W/2 \text{ or } R > W_o + W/2 \end{cases}$$

When the shaping element 22 shapes the laser beam 211 into the annular beam 221, the phase of the annular beam 221 is affected, such that the aberration of the annular beam 221 is increased, and the diffusion angle of the annular beam 221 also becomes larger. When the annular beam 221 has propagated some distances, unexpected changes in the shape of the annular beam 221 may occur, which leads to a non-uniform distribution of the light intensity. This may in turn influence the uniformity of the focused beam 251 produced (such as a Bessel beam).

In step S33, in order to address the issues of an increase in the aberration and an increase in the diffusion angle of the annular beam 221, the collimating element 23 can reduce the aberration of the annular beam 221, and modifies the direction of the annular beam 221 produced by the shaping element 22 in accordance with the direction of an optical axis L, for example, by reducing the diffusion angle to be within 10 degrees, so as to turn the annular beam 221 into a collimated annular beam 231 (the annular beam after collimation or modification) as shown in FIG. 4C to avoid the propagation mode of the annular beam 221 being modified, and in turn eliminates impact on the uniformity of the focused beam 251 subsequently produced (see FIG. 4E). The diffusion angle of the annular beam 221 is smaller, which means that smaller optical elements can be used, which the cost of building a laser uniformly machining apparatus 2 is reduced.

In step 34, the scaling elements 24a and 24b adjust the collimated annular beam 231 in accordance with a scaling ratio to produce a scaled annular beam 241 as shown in FIG. 4D (i.e., the annular beam after scaling or adjusting). For example, the scaling elements 24a and 24b can scale-up or scale-down the collimated annular beam 231 in accordance with an adjustable scaling ratio or a fixed scaling ratio to produce the scaled annular beam 241. In an embodiment, the scaled annular beam 241 is scaled by a certain ratio, and the annular width W and the diameter Wo of the scaled annular beam 241 are both adjusted by the same scaling ratio of the scaling elements 24a and 24b. Therefore, after passing through the focusing element 25, the scaled annular beam 241 can be turned into a focused beam 251 with an adjustable machining range or machining depth of view. The adjustable scaling ratio or fixed scaling ratio of the scaling elements 24a and 24b can be any value between 0.1 to 10, such as 0.1, 0.5, 1, 2 or 10.

In step S35, the focusing element 25 focuses the scaled annular beam 241 produced by the scaling elements 24a and 24b into a focused beam 251 as shown in FIG. 4E, and the focused beam 251 has a uniform light intensity in the direction of the optical axis L.

In an embodiment, when the adjustable numerical value N of the envelope function $(R-r_o)^{-N}$ of the annular beam 221 is within the range of 0.1 to 5, the focused beam 251 of FIG. 4E may have a uniform or flat top distribution of the light intensity (see machining range B) in the direction of the optical axis L, and the uniformity of the light intensity of the focused beam 251 is greater than 70%, which is improved over the focused beam 1 of the prior art shown in FIG. 1, where the uniformity of the light intensity of the focused beam 1 is less than 50%.

FIGS. 4E' and 4E" are graphs depicting distributions of light intensities of the focused beams 251 with different machining ranges produced by scaling elements 24a and 24b with different scaling ratios in the laser uniformly machining apparatus 2 of FIG. 2 in accordance with the present disclosure.

As shown, as the scaling ratio of the scaling elements 24a and 24b changes, the magnitudes of the annular width W and the diameter $W_o$ of the scaled annular beam 241 will also be changed. The change in the annular width W of the scaled annular beam 241 will affect the working interval (or working distance) of the focused beam 251, and the change in the diameter $W_o$ of the scaled annular beam 241 will affect the machining range B or machining depth of view of the focused beam 251. Thus, when the scaling ratio of the scaling elements 24a and 24b changes, the annular width W of the scaled annular beam 241 is changed by a certain ratio, which effectively adjusts the focused beam 251 to have a machining range B' as shown in FIG. 4E' (with a magnification of approximately 1) or a machining range B" as shown in FIG. 4E" (with a magnification of approximately 2), and also the non-machining ranges C' and C" as shown in FIGS. 4E' and 4E", respectively.

Therefore, as shown in FIGS. 4E, 4E' and 4E", using the focused beam 251 with a uniform or flat-top distribution of light intensity (see machining range B, B' or B") in the direction of the optical axis L for machining a workpiece, the present disclosure can produce a uniform distribution of light intensity on the thickness of the workpiece, thereby delivering better machining quality. Besides, on the direction of the optical axis L, the rate of energy attenuation at the ends (see non-machining range C) of the focused beam 251 of the present disclosure is faster than that at the ends (see non-machining range 12) of the focused beam 1 of the prior art of FIG. 1, thereby more clearly defining the machining range B (B' or B") shown in FIG. 2 (FIG. 4E to FIG. 4E") and non-machining range C (C' or C"), and overcoming the issue of laser machining apparatus according to the prior art that is not suitable for a half-cut manufacturing process.

Moreover, as shown in FIGS. 4D and 4E, when the intensity at the edge of the scaled annular beam 241 attenuates quickly to zero, minor oscillations are introduced to the uniform distribution (flat-top distribution) of the light intensity of the focused beam 251. In order to address this oscillation problem, the scaled annular beam 241 can be made to attenuate to zero more smoothly (see FIGS. 4E' and 4E"). In view of this, the shaping element 22 may instead shape the distribution of light intensity of the scaled annular beam 241 in accordance with the relationships between light intensity I and a radial coordinate R of the annular beam 221 as shown in Equation (2) below.

$$I(R)=I_o \cdot (R-r_o)^{-N} \cdot D(R,W,W_o)+S(R,W,W_o) \quad (2)$$

wherein $S(R, W, W_o)$ is a smooth function that can smoothly adjust the attenuation rate at the edge of the annular beam 221.

Thus, by suitably adjusting the smooth function $S(R, W, W_o)$, the uniformity of the distribution of the light intensity of the focused beam 251 in the direction of the optical axis L can be enhanced. Generally speaking, the uniformity of the distribution of the light intensity of the focused beam 251 can be raised from 70% to 90%. Fundamentally, the smooth function $S(R, W, W_o)$ is used only to alter the rate of attenuation at the edge of the annular beam 221 without affecting the envelope strength much.

In summary, the laser uniformly machining apparatus and method according to the present disclosure can adjust (increasing or decreasing) the machining range of a focused beam in the direction of the optical axis and increase the uniformity of distribution of light intensity of the focused beam, thereby achieving uniformity in machining results of the workpiece as well as increasing the machining speed of the workpiece. The present disclosure is suitable for half-cut processes of compound workpieces, and further reduces unnecessary energy waste and the building cost of the laser machining apparatus.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A laser uniformly machining apparatus, comprising:
a laser unit for providing a laser beam for machining;
a first plano-convex lens for shaping the laser beam into an annular beam;
a second plano-convex lens with a convex surface directly facing a convex surface of the first plano-convex lens for modifying a direction of the annular beam in accordance with a direction of an optical axis to turn the annular beam into a collimated annular beam, wherein the annular beam from the first plano-convex lens is directly into the second plano-convex lens;
a third plano-convex lens and a fourth plano-convex lens with convex surfaces directly facing each other for adjusting the collimated annular beam in accordance with a scaling ratio to produce a scaled annular beam, wherein the second plano-convex lens directly faces the third plano-convex lens, and the collimated annular beam from the second plano-convex lens is directly into the third plano-convex lens, and the collimated annular beam after passing through the third plano-convex lens is directly into the fourth plano-convex lens; and
a fifth plano-convex lens for focusing the scaled annular beam;
wherein the scaled annular beam is directly to a plane surface of the fifth plano-convex lens to form a focused beam having a uniform distribution of light intensity in the direction of the optical axis, and the scaled annular beam after passing through the fourth plano-convex lens is directly into the fifth plano-convex lens.

2. The laser uniformly machining apparatus of claim 1, wherein the laser beam is a Gaussian beam, and the focused beam is a Bessel beam.

3. The laser uniformly machining apparatus of claim 1, wherein the first plano-convex lens is a phase modulation element, an amplitude modulation element, a diffraction element, an aspheric element, a spherical element, an absorption filter or a reflective filter.

4. The laser uniformly machining apparatus of claim 1, wherein the first plano-convex lens is to adjust a distribution of light intensity of the annular beam in accordance with a relationship between the light intensity and a radial coordinate of the annular beam represented by an equation below:

$$I(R)=I_o \cdot (R-r_o)^{-N} \cdot D(R,W,W_o),$$

wherein I is the light intensity of the annular beam; R is the radial coordinate of the annular beam; $I_o$ and $r_o$ are constants; N is an adjustable numerical value; W and $W_o$ are an annular width and a diameter of the annular beam, respectively; $(R-r_o)^{-N}$ is an envelope function of the annular beam; and $D(R, W, W_o)$ is an annular width function of the annular beam, and wherein $$D(R, W, W_o) \approx 1, \text{ when } W_o-W/2 \leqq R \leqq W_o+W/2,$$

$$D(R, W, W_o) \approx 0, \text{ when } R<W_o-W/2 \text{ or } R>W_o+W/2.$$

5. The laser uniformly machining apparatus of claim 4, wherein the first plano-convex lens is to adjust the distribution of the light intensity of the annular beam in accordance with a relationship between the light intensity and the radial coordinate of the annular beam represented by an adjusted equation below:

$$I(R)=I_o \cdot (R-r_o)^{-N} \cdot D(R,W,W_o)+S(R,W,W_o),$$

wherein $S(R, W, W_o)$ is a smooth function smoothly adjusting an attenuation rate at an edge of the annular beam.

6. The laser uniformly machining apparatus of claim 1, wherein the second plano-convex lens is a phase modulation element, a diffraction element, an aspheric element or a spherical element.

7. The laser uniformly machining apparatus of claim 1, wherein the second plano-convex lens is to reduce a diffusion angle of the annular beam shaped by the first plano-convex lens to be within 10 degrees to produce the collimated annular beam.

8. The laser uniformly machining apparatus of claim 1, wherein the third plano-convex lens and the fourth plano-convex lens are to scale-up or scale-down the collimated annular beam into the scaled annular beam in accordance with an adjustable scaling ratio or a fixed scaling ratio for the scaled annular beam, after passing through the focusing element, to be turned into the focused beam with an adjustable machining range or an adjustable machining depth of view.

9. The laser uniformly machining apparatus of claim 1, wherein the fifth plano-convex lens is a rotating prism, a diffraction element, a spherical element or an aspheric element.

10. The laser uniformly machining apparatus of claim 1, wherein the light intensity of the focused beam is in uniform distribution or flat-top distribution.

11. A laser uniformly machining method, comprising:
providing a laser beam for machining;

shaping, by a first plano-convex lens, the laser beam into an annular beam;

modifying, by a second plano-convex lens with a convex surface directly facing a convex surface of the first plano-convex lens, a direction of the annular beam in accordance with a direction of an optical axis to turn the annular beam into a collimated annular beam, wherein the annular beam from the first plano-convex lens is directly into the second plano-convex lens;

adjusting, by a third plano-convex lens and a fourth plano-convex lens with convex surfaces directly facing each other, the collimated annular beam in accordance with a scaling ratio to produce a scaled annular beam, wherein the second plano-convex lens directly faces the third plano-convex lens, and the collimated annular beam from the second plano-convex lens is directly into the third plano-convex lens, and the collimated annular beam after passing through the third plano-convex lens is directly into the fourth plano-convex lens; and focusing the scaled annular beam directly to a plane surface of a fifth plano-convex lens to form a focused beam having a uniform distribution of light intensity in the direction of the optical axis, wherein the scaled annular beam after passing through the fourth plano-convex lens is directly into the fifth plano-convex lens.

12. The laser uniformly machining method of claim 11, wherein the laser beam is a Gaussian beam, and the focused beam is a Bessel beam.

13. The laser uniformly machining method of claim 11, wherein a distribution of light intensity of the annular beam is adjusted in accordance with a relationship between the light intensity and a radial coordinate of the annular beam represented by an equation below:

$$I(R) = I_o \cdot (R - r_o)^{-N} \cdot D(R, W, W_o)$$

wherein I is the light intensity of the annular beam; R is the radial coordinate of the annular beam; $I_o$ and $r_o$ are constants; N is an adjustable numerical value; W and $W_o$ are an annular width and a diameter of the annular beam, respectively; $(R - r_o)^{-N}$ is an envelope function of the annular beam; and $D(R, W, W_o)$ is an annular width function of the annular beam, and wherein $$D(R, W, W_o) \approx 1, \text{ when } W_o - W/2 \leq R \leq W_o + W/2,$$

$$D(R, W, W_o) \approx 0, \text{ when } R < W_o - W/2 \text{ or } R > W_o + W/2.$$

14. The laser uniformly machining method of claim 13, wherein the distribution of the light intensity of the annular beam is adjusted in accordance with a relationship between the light intensity and the radial coordinate of the annular beam represented by an adjusted equation below:

$$I(R) = I_o \cdot (R - r_o)^{-N} \cdot D(R, W, W_o) + S(R, W, W_o),$$

wherein $S(R, W, W_o)$ is a smooth function smoothly adjusting an attenuation rate at an edge of the annular beam.

15. The laser uniformly machining method of claim 13, wherein the adjustable numerical value is in a range of from 0.1 to 5.

16. The laser uniformly machining method of claim 11, wherein a diffusion angle of the annular beam is reduced to be within 10 degrees to produce the collimated annular beam.

17. The laser uniformly machining method of claim 11, wherein an aberration of the collimated annular beam is smaller than an aberration of the annular beam.

18. The laser uniformly machining method of claim 11, wherein the collimated annular beam is scaled-up or scaled-down into the scaled annular beam in accordance with an adjustable scaling ratio or a fixed scaling ratio for the scaled annular beam to be turned into the focused beam with an adjustable machining range or an adjustable machining depth of view.

19. The laser uniformly machining method of claim 18, wherein the adjustable scaling ratio or the fixed scaling ratio is within a range of from 0.1 to 10.

20. The laser uniformly machining method of claim 11, wherein the light intensity of the focused beam is homogeneously distributed or flat-top distributed.

* * * * *